United States Patent
Munro et al.

(10) Patent No.: US 6,814,373 B2
(45) Date of Patent: Nov. 9, 2004

(54) SYSTEM AND METHOD FOR ENERGY MANAGEMENT IN A STEERING COLUMN OF A MOTOR VEHICLE

(75) Inventors: Scott Munro, Windsor (CA); Glenn F Syrowik, Ortonville, MI (US); Gregory A Wasek, Shelby Township, MI (US); Jeffrey D Ottenhoff, Lake Orion, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 99 days.

(21) Appl. No.: 10/305,290

(22) Filed: Nov. 26, 2002

(65) Prior Publication Data

US 2004/0100084 A1 May 27, 2004

(51) Int. Cl.[7] .............................. B62D 1/19; F16F 7/12
(52) U.S. Cl. ........................................ 280/777; 188/371
(58) Field of Search ........................ 280/777; 188/371; 74/492, 493

(56) References Cited

U.S. PATENT DOCUMENTS

| | | | |
|---|---|---|---|
| 4,838,576 A | * | 6/1989 | Hamasaki et al. .......... 280/777 |
| 4,901,592 A | * | 2/1990 | Ito et al. .................... 280/777 |
| 4,989,898 A | * | 2/1991 | Yamaguchi et al. ........ 280/777 |
| 5,052,716 A | * | 10/1991 | Matsumoto ................. 280/777 |
| 5,375,881 A | * | 12/1994 | Lewis ........................ 280/777 |
| 5,547,221 A | * | 8/1996 | Tomaru et al. ............. 280/777 |
| 5,788,278 A | * | 8/1998 | Thomas et al. ............. 280/777 |
| 5,979,860 A | | 11/1999 | Jurik et al. |
| 6,170,873 B1 | * | 1/2001 | Jurik et al. ................. 280/777 |
| 6,394,241 B1 | * | 5/2002 | Desjardins et al. ......... 188/371 |

* cited by examiner

Primary Examiner—Paul N. Dickson
Assistant Examiner—Joselynn Y Sliteris
(74) Attorney, Agent, or Firm—Ralph E. Smith

(57) ABSTRACT

A steering column mounting system that includes a mounting bracket fixedly attached to a steering column and at least one pull strap made of a resiliently bendable material, the pull strap having a first leg with a slot through which extends a fastener fixedly attached to a motor vehicle structure and having a free second leg substantially parallel to the first leg. The pull strap has at least two portions having different widths. The widths of the portions of the pull strap may be selected so as to provide a predetermined amount of resiliency to the unwinding of the pull straps. The widths of the portions of the pull strap may also be selected so as to provide differing amounts of resiliency at different stages of the unwinding of the pull straps. A support frame is attached to the mounting bracket and maintains the first leg and the second leg of the pull strap substantially parallel relative to each other. Upon relative movement between the mounting bracket and the fastener, the pull strap is caused to unwind. The mounting bracket may also include a slot through which extends a fastener fixedly attached to a motor vehicle structure, the mounting bracket having a tapered cross-section over a length of the slot such that frictional force between the fastener and the mounting bracket is reduced when the fastener is caused to move from a first end of the slot to a second end of the slot.

18 Claims, 4 Drawing Sheets

SYSTEM AND METHOD FOR ENERGY MANAGEMENT IN A STEERING COLUMN OF A MOTOR VEHICLE

FIELD OF THE INVENTION

The present invention relates to a steering column of a motor vehicle. More specifically, the present invention relates to a steering column mounting system and method for absorbing energy in the steering column of a motor vehicle.

BACKGROUND INFORMATION

When a motor vehicle is involved in a collision, the driver of the motor vehicle may forcefully impact the steering wheel. In order to reduce the force of this impact, a conventional steering column may be controllably collapsible. More specifically, when the driver impacts the steering wheel in a collision, the steering column partially collapses so as to absorb some of the impact force.

One example of a conventional energy-absorbing steering column support system is shown and described in U.S. Pat. No. 6,170,873 entitled "Steering Column Mounting Bracket with Pull Loops" and includes a mounting bracket having a steering column extendable therethrough. The mounting bracket has four slots through which the bracket is secured to the structure of the motor vehicle by fasteners, e.g., bolts or capsules. A frictional force of the fasteners in the slots prevents the steering column from collapsing until an impact force of the driver against the steering wheel overcomes the frictional force and causes the fasteners to slide within the slots, thereby absorbing some of the impact. In addition, the mounting bracket has a pair of resilient, but bendable, U-shaped pull loops associated with a lower two of the slots. A first end of each pull loop has a hole through which extends the fastener associated with the slot, while a second end of the pull loop is free to move. When a collision occurs and the impact force of the driver against the steering wheel causes the fastener to move within the slot, the U-shaped pull loop is caused to unwind. Since the pull loops are resiliently bendable, the unwinding of the pull loop is resisted, thereby absorbing some of the energy and reducing the force of the impact of the driver against the steering wheel.

While conventional steering column mounting systems provide some energy absorbing capabilities, they typically rely on frictional forces to maintain the steering column in its initial position prior to collision. These frictional forces may also be present while the steering column is moving during a collision and may reduce the effectiveness of the steering column in absorbing energy during a collision.

Thus, there is a need to provide a steering column mounting system and method that provides improved effectiveness in absorbing energy during a collision.

It is therefore an object of the present invention to provide a steering column mounting system and method that provides improved effectiveness in absorbing energy during a collision.

It is another object of the present invention to provide a system and method that provides adequate friction forces to maintain a steering column in its initial position prior to a collision.

It is another object of the present invention to provide a system and method that substantially reduces the friction forces present in the steering column mounting system when the steering column is moving during a collision.

SUMMARY OF THE INVENTION

The above and other beneficial objects of the present invention are achieved by providing a system and method as described herein. The present invention, according to one example embodiment thereof, relates to a steering column mounting system that includes a mounting bracket fixedly attached to a steering column and at least one pull strap made of a resiliently bendable material. The pull strap has a first leg with a slot. Extending through the slot is a fastener fixedly attached to a motor vehicle structure. The pull strap also has a free second leg substantially parallel to the first leg. Upon relative movement between the mounting bracket and the fastener, e.g., upon a driver impacting the steering column during a collision, the pull strap is caused to unwind.

The pull strap may have two or more unwinding portions having different widths. The widths of the portions of the pull strap may be selected so as to provide a predetermined amount of resiliency to the unwinding portions of the pull straps. The widths of the portions of the pull strap may also be selected so as to provide differing amounts of resiliency at different stages of the unwinding of the pull straps. A support frame is attached to the mounting bracket and maintains the first leg and the second leg of the pull strap substantially parallel relative to each other during the unwinding of the pull strap.

The mounting bracket may also include a slot through which extends the fastener fixedly attached to a motor vehicle structure. The mounting bracket may have a tapered, e.g., decreasing, cross-section over a length of the slot. In this manner, a frictional force between the fastener and the mounting bracket, which is sufficient to maintain the position of the fastener relative to the mounting bracket prior to a collision, is substantially reduced when the fastener is caused to move from a first end of the slot to a second end of the slot during a collision.

DETAILED DESCRIPTION

Figure 1:
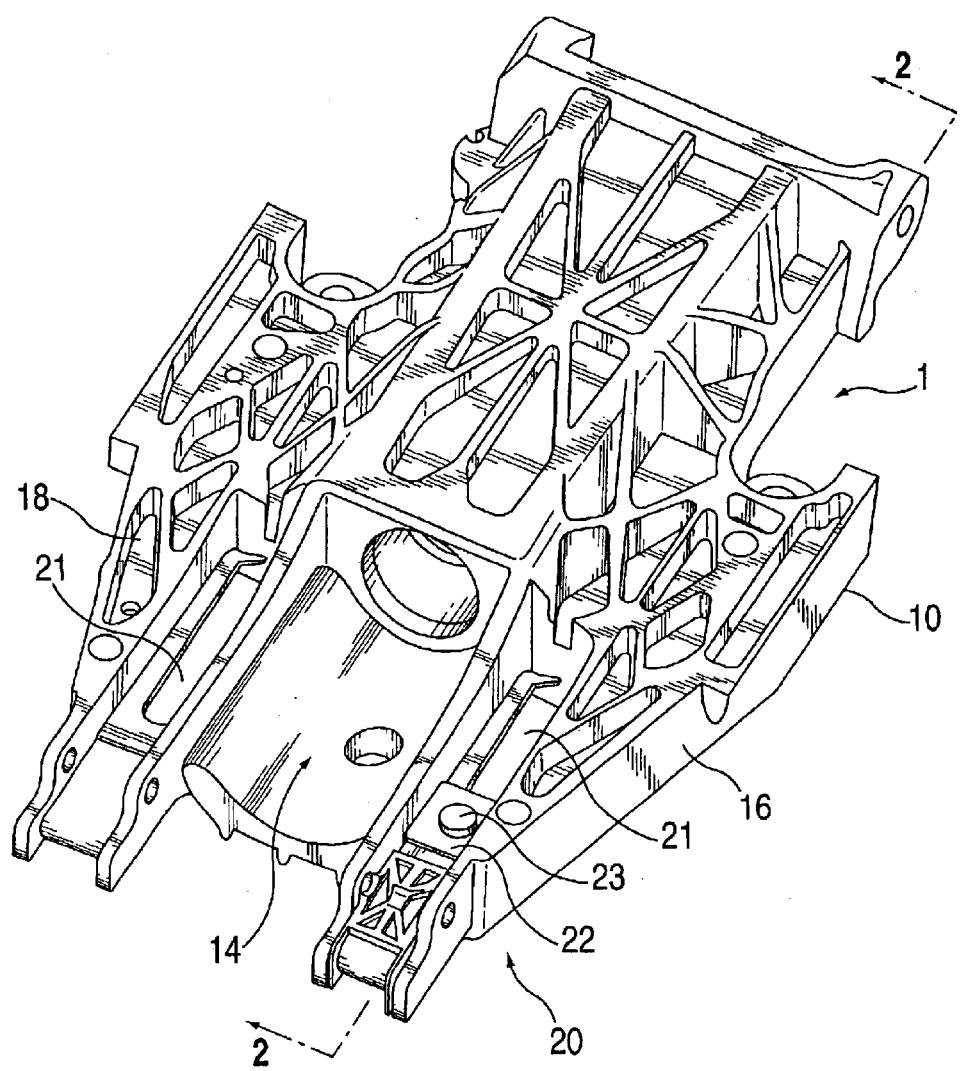
FIG. 1 is a perspective view that illustrates a steering column mounting bracket 10, in accordance with one example embodiment of the present invention.

FIG. 1 is a perspective view that illustrates a steering column mounting system 1 having a mounting bracket 10, in accordance with one example embodiment of the present invention. The mounting bracket 10 is configured to be movably secured to the structure of a motor vehicle. In addition, the mounting bracket 10 is rigidly secured to a steering column extendable therethrough. In the example embodiment shown, the mounting bracket 10 has a central passage 14 through which the steering shaft of the steering column extends. A steering wheel is mounted on the upper end of the steering shaft.

The mounting bracket 10 has a lower end portion 20, with first and second wing portions 16, 18 on opposite sides of the central passage 14. Each of the first and second wing portions 16, 18 has a closed slot 21. A fastener 22 (one of which is shown in the slot 21 of the wing portion 16) is provided in each slot 21. Each fastener 22 may include a capsule 23 disposed in one of the slots 21. In one example embodiment of the present invention, the capsules 23 may be provided to secure the mounting bracket 10 to the vehicle structure in several other locations. The capsules 23 may be shearable upon impact, such as the shearable capsules shown and described in U.S. Pat. No. 5,979,860, which is hereby incorporated by reference herein as fully as if set forth in its entirety.

Figure 2:
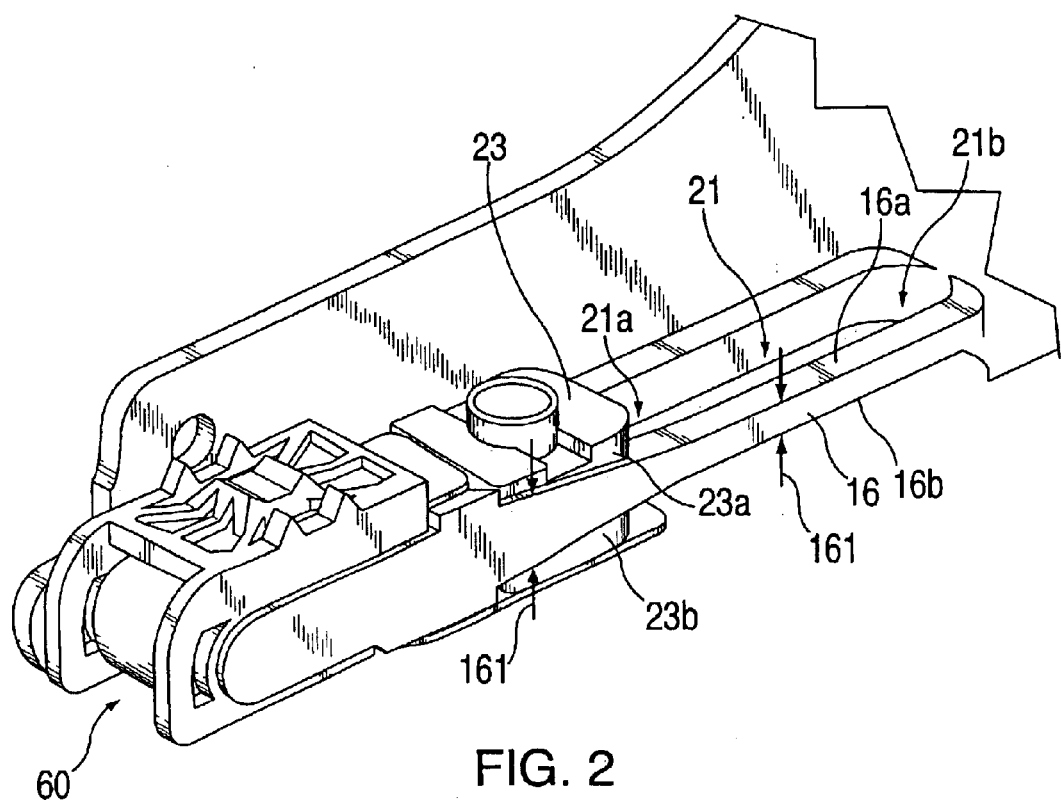
FIG. 2 is a cross-sectional view of the mounting bracket taken along the lines 2—2 in FIG. 1.

FIG. 2 is a cross-sectional view, shown in perspective, of the mounting bracket 10 taken along the lines 2—2 in FIG. 1. FIG. 2 illustrates the capsule 23 in an initial position at a first end 21a of the slot 21, prior to an impact force being applied to the mounting bracket 10. The capsule 23 has upper and lower flanges 23a, 23b that contact upper and lower surfaces 16a, 16b of the wing portion 16 immediately adjacent to the slot 21. The upper and lower flanges 23a, 23b of the capsule 23 slidably retain the capsule 23 within the slot 21. The wing portions 16, 18 have a tapered cross-sectional thickness in the region of the slot 21. For instance, referring to wing portion 16, a thickness 161 of the wing portion 16 at a location adjacent to the first end 21a of the slot 21 may be substantially the same as a distance between the upper and lower flanges 23a, 23b of the capsule 23. In the initial position shown in FIG. 2, the upper and lower flanges 23a, 23b of the capsule 23 frictionally engage the upper and lower surfaces 16a, 16b of the wing portion 16 at the first end 21a of the slot 21. The thickness of the wing portion 16 decreases such that, at a location adjacent to the second end 21b of the slot 21, the wing portion 16 has a thickness that is less than the distance between the upper and lower flanges 23a, 23b of the capsule 23.

Figure 3:
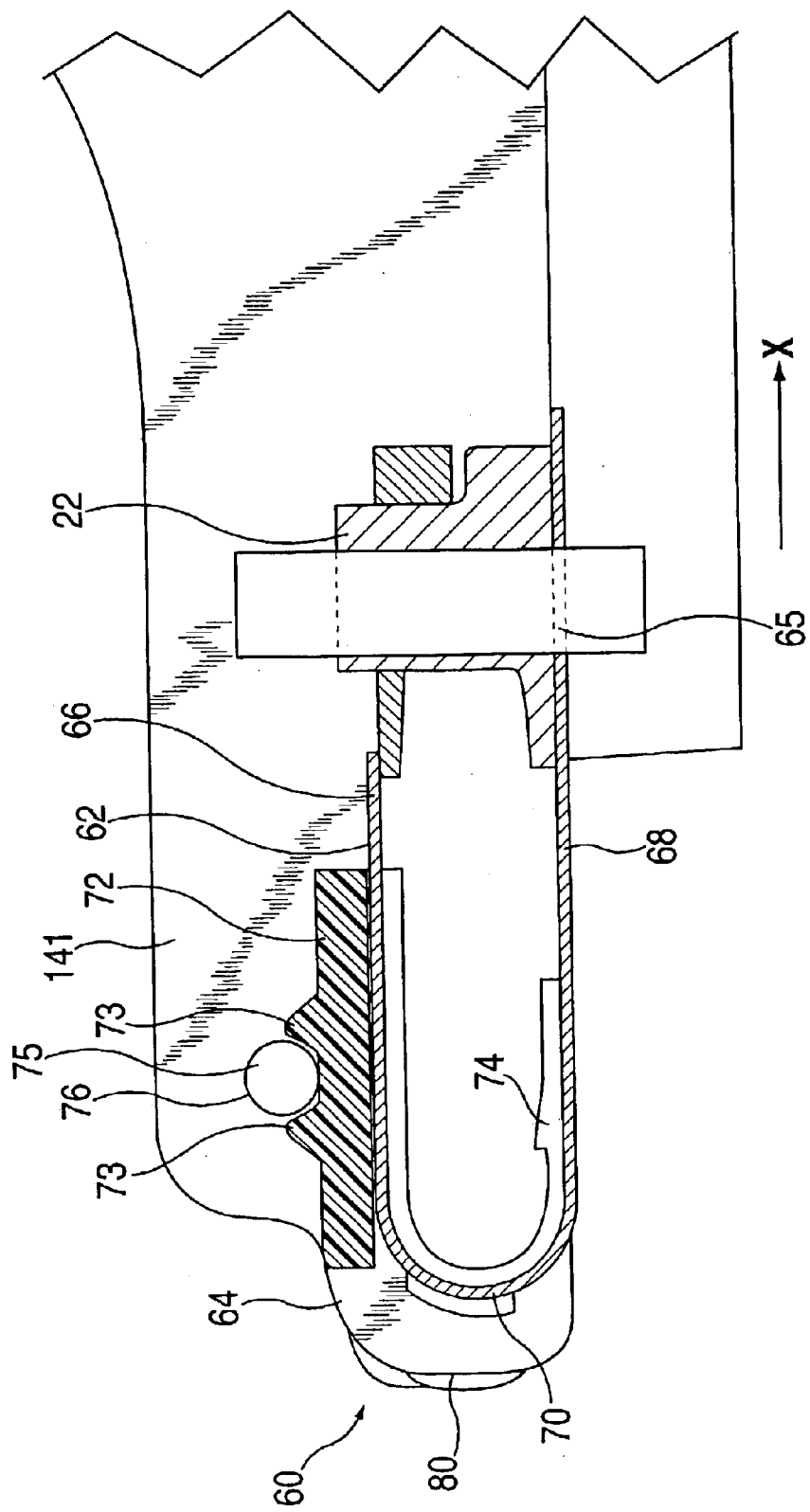
FIG. 3 is a cross-sectional view that illustrates a pull strap attached to a mounting bracket, in accordance with one example embodiment of the present invention.

The mounting bracket 10 also has a pull strap assembly 60 associated with each of the wing portions 16, 18. FIG. 3 is a cross-sectional view that illustrates the pull strap assembly 60, in accordance with one example embodiment of the present invention. Each pull loop assembly 60 includes an elongated, generally U-shaped strap 62 and a support frame 64 of plastic or the like affixed to the mounting bracket 10. The strap 62 is formed from a length of resiliently bendable or flexible material, e.g., metal, having an upper leg 66 and a lower leg 68 spaced from and substantially parallel to each other. A fastener, such as the fastener 22 that includes the capsule 23, extends through a slot 65 in the lower leg 68 of the strap 62. The upper leg 66 may be free and unattached. Each strap 62 has a curved portion 70. The support frame 64 also has an upper leg 72 and a lower leg 74 and a curved portion 80. The support frame 64 is fitted around the strap 62 such that the upper leg 72 of the support frame 64 is in contact with the upper leg 66 of the strap 62, and the lower leg 74 of the support frame 64 is in contact with the lower leg 68 of the strap 62. The support frame 64 also includes a pair of projections 73 that project above the surface of the upper leg 72 of the support frame 64 and that may engage a fastener 75 extending through a hole 76 in a sidewall 141 of the central passage 14. In this manner, the support frame 64 is maintained in a fixed position relative to the mounting bracket 10.

Figure 4:
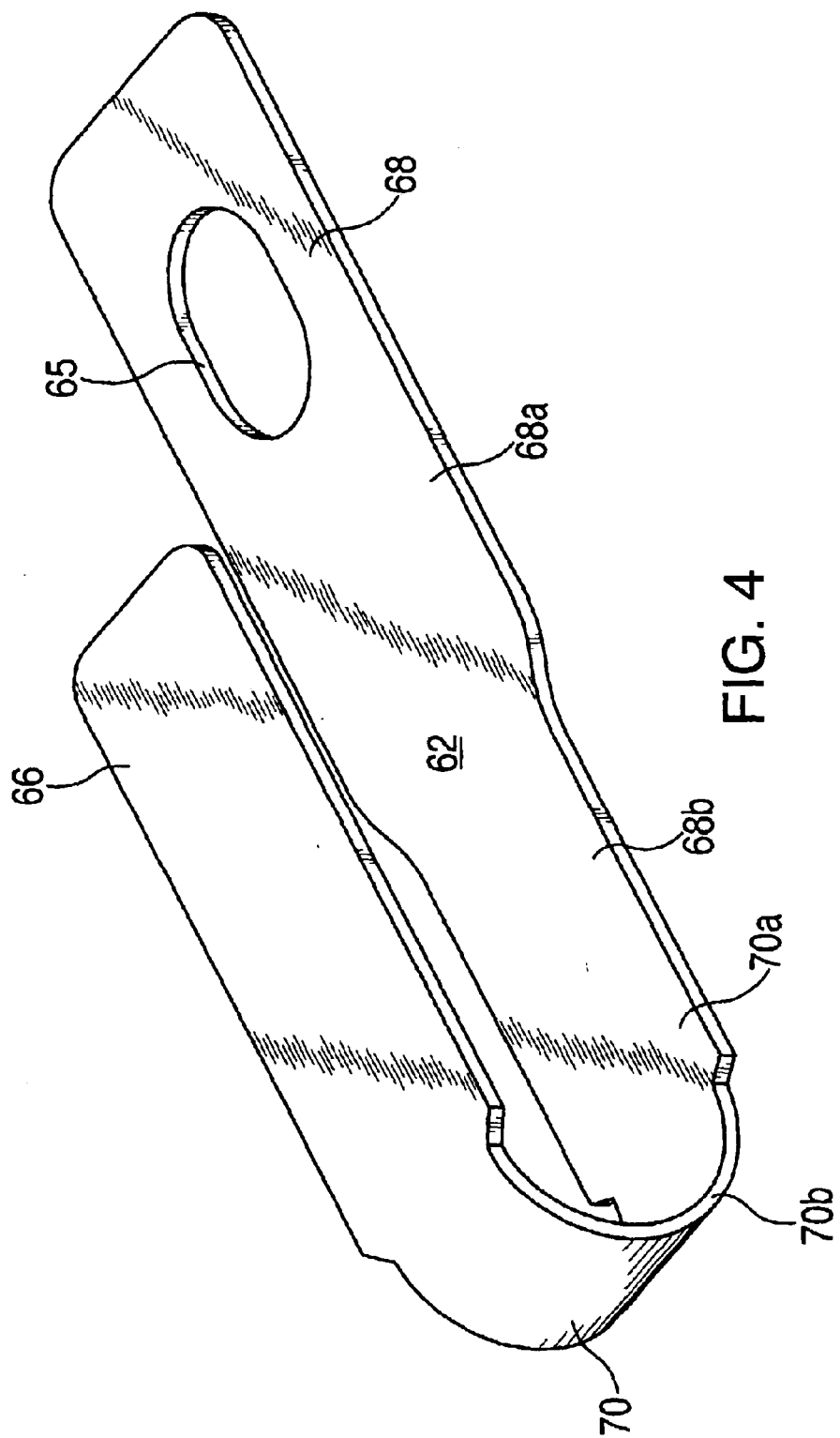
FIG. 4 is a perspective view of a pull strap, in accordance with one example embodiment of the present invention.

FIG. 4 is a perspective view of the pull strap 62, in accordance with one example embodiment of the present invention. The lower leg 68 of the pull strap 62 includes the slot 65. In addition, the lower leg 68 may include several portions having different widths. For instance, a first portion 68a has a first width and a second portion 68b has a second width. In addition, the curved portion 70 of the pull strap 62 may also include several portions having different widths. For instance, a first portion 70a has a first width and a second portion 70b has a second width. In addition, the upper leg 66 may include several portions having different widths. Advantageously, at least two portions of the pull strap 62 having different widths may be caused to unwind.

As previously mentioned, the mounting bracket 10 is configured to permit a controlled collapse of the steering column when a collision causes the driver to impact the steering wheel. More specifically, prior to an impact force, the upper and lower flanges 23a, 23b of the capsule 23 frictionally maintain the fastener 22, e.g., capsule 23, at a location adjacent to the first end 21a of the slot 21, as does the resiliency of the pull straps 62. When an impact occurs and the mounting bracket 10 is caused to move relative to the fastener 22, the frictional force between the upper and lower flanges 23a, 23b of the capsule 23 and the wing portions 16, 18 is overcome, and the capsules 23 are caused to slide within the slots 21. Because the cross-sectional thickness of the wing portions 16, 18 decreases in the direction of the second end 21b of the slot 21, after the initial frictional force has been overcome there is virtually no friction between the upper and lower flanges 23a, 23b of the capsule 23 and the wing portions 16, 18.

In addition, when an impact force of the driver against the steering wheel overcomes the frictional force of the capsules 23 and causes the fasteners 22 to slide within the slots 21, the U-shaped pull straps are also engaged. For instance, the initial movement of the mounting bracket 10 relative to the fastener 22 causes the fastener 22 to move within the slot 65 of the lower leg 68 of the strap 62. Thus, upon impact, the strap 62 may not move immediately, but may instead momentarily delay the absorption of the impact energy by the pull straps 62. Once the fastener 22 has moved the length of the slot 65, continued movement of the fastener 22 causes deformation of the pull strap 62. Specifically, the movement of the fastener 22 in the direction of arrow X (shown in FIG. 3) causes the lower leg 68 of the pull strap 62 to also move in the direction of arrow X and the upper leg 66 of the pull strap 66 to move in a direction opposite the direction of arrow X. However, because the support frame 64 prevents the curved end 70 of the pull strap 62 from moving in the direction of arrow X, the pull strap 62 is caused to unwind. The resiliency of the pull strap 62 provides resistance to this unwinding, thereby absorbing some of the impact energy during a collision and reducing the force of the impact of the driver against the steering wheel. The widths of the various portions of the pull strap 62 may be selected so as to provide a predetermined amount of resiliency to the unwinding of the pull straps 62. In addition, the widths of the portions of the pull strap 62 may be selected so as to provide differing amounts of resiliency at different stages of the unwinding of the pull straps 62, e.g., more resiliency at the beginning of the unwinding and less resiliency at the end of the unwinding, or vice versa. The support frame 64 maintain the upper and lower legs 66, 68 of the strap 62 parallel to each other during the unwinding of the strap 62.

The steering column mounting system 1, in accordance with one example embodiment of the present invention, thus provides improved effectiveness in absorbing energy during a collision. For instance, because the cross-sectional thickness of the wing portions 16, 18 decreases in the direction of the second end 21b of the slot 21, there is virtually no friction between the upper and lower flanges 23a, 23b of the capsule 23 and the wing portions 16, 18 after the initial frictional force has been overcome. Thus, the mounting bracket 10 provides adequate frictional forces to maintain the steering column in its initial position prior to a collision but is less likely than conventional steering column mounting systems to bind or to suffer from other negative effects caused by frictional forces during a collision.

Furthermore, the steering column mounting system 1 of the present invention, in accordance with one example embodiment thereof, may enable the amount of energy absorption to correspond more accurately to the impact forces likely to be present. For instance, by providing differing widths of the various portions of the pull strap 62, an amount of energy absorption most appropriate to a type of vehicle or driver may be selected, so as to provide a predetermined amount of resiliency to the unwinding of the pull straps 62. Still further, by varying the widths of different portions of the pull strap 62, different amounts of resiliency at different stages of the unwinding of the pull straps 62 may be achieved, thereby optimizing the amount of energy absorbed at different stages of a collision or for different degrees of collision, e.g., a very forceful collision or a minor collision.

Thus, the several aforementioned objects and advantages of the present invention are most effectively attained. Those skilled in the art will appreciate that numerous modifications of the example embodiments described hereinabove may be made without departing from the spirit and scope of the invention. Although various example embodiments of the present invention have been described and disclosed in detail herein, it should be understood that this invention is in no sense limited thereby and that its scope is to be determined by that of the appended claims.

What is claimed is:

1. A steering column mounting system comprising:

a mounting bracket fixedly attached to a steering column and including at least one slot through which extends fastener fixedly attached to a motor vehicle structure, the mounting bracket having a tapered cross-section over a length of the slot such that a frictional force between the fastener and the mounting bracket is reduced when the fastener is caused to move from a first end of the slot to a second end of the slot;

at least one pull strap having a first leg with an opening through which extends the fastener and having a free second leg substantially parallel to the first leg, the pull strap including at least two portions having different widths; and a support frame attached to the mounting bracket and configured to maintain the first leg and the second leg of the pull strap substantially parallel relative to each other;

wherein, the portions of the pull strap having different widths are arranged to unwind upon relative movement between the mounting bracket and the fastener.

2. The system of claim 1, wherein the pull strap includes a resiliently bendable material.

3. The system of claim 2, wherein the pull strap is made of metal.

4. The system of claim 2, wherein the widths of the portions of the pull strap are selected so as to provide a predetermined amount of resiliency to the unwinding of the pull straps.

5. The system of claim 2, wherein the widths of the portions of the pull strap are selected so as to provide differing amounts of resiliency at different stages of the unwinding of the pull straps.

6. The system of claim 1, wherein the opening of the pull strap is a slot, the fastener arranged to move within the slot of the pull strap prior to unwinding of the pull strap.

7. The system of claim 1, wherein the frictional force between the fastener and the mounting bracket is sufficient at a first end of the slot to maintain the position of the fastener relative to the mounting bracket until a predetermined force is applied to the mounting bracket.

8. The system of claim 7, wherein the frictional force between the fastener and the mounting bracket is substantially reduced once the predetermined amount of force is applied to the mounting bracket so as to overcome the frictional force at a first end of the slot.

9. A steering column mounting system comprising:

a mounting bracket fixedly attached to a steering column, the mounting bracket including at least one slot through which extends a fastener fixedly attached to a motor vehicle structure the mounting bracket having a tapered cross-section over a length of the slot such that frictional force between the fastener and the mounting bracket is reduced when the fastener is caused to move from a first end of the slot to a second end of the slot.

10. The system of claim 9, wherein the frictional force between the fastener and the mounting bracket is sufficient at a first end of the slot to maintain the position of the fastener relative to the mounting bracket until a predetermined force is applied to the mounting bracket.

11. The system of claim 10, wherein the frictional force between the fastener and the mounting bracket is substantially reduced once the predetermined amount of force is applied to the mounting bracket so as to overcome the frictional force at a first end of the slot.

12. The system of claim 9, further comprising at least one pull strap having a first leg with a slot through which extends the fastener fixedly attached to a motor vehicle structure and having a free second leg substantially parallel to the first leg, the pull strap including at least two portions having different widths, wherein the two portions of the pull strap having different widths are caused to unwind upon relative movement between the mounting bracket and the fastener.

13. The system of claim 12, wherein the pull strap is made of a resiliently bendable material.

14. The system of claim 13, wherein the pull strap is made of metal.

15. The system of claim 13, wherein the widths of the portions of the pull strap are selected so as to provide a predetermined amount of resiliency to the unwinding of the pull straps.

16. The system of claim 13, wherein the widths of the portions of the pull strap are selected so as to provide differing amounts of resiliency at different stages of the unwinding of the pull straps.

17. The system of claim 9, wherein the fastener is arranged to move within the slot of the pull strap prior to unwinding of the pull strap.

18. The system of claim 9, further comprising a support frame attached to the mounting bracket and configured to maintain the first leg and the second leg of the pull strap substantially parallel relative to each other.

* * * * *